(12) United States Patent
Ishizaki et al.

(10) Patent No.: US 6,896,086 B2
(45) Date of Patent: May 24, 2005

(54) VEHICLE HOOD CONTROL APPARATUS

(75) Inventors: Tatsuya Ishizaki, Wako (JP); Teruaki Aizawa, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/224,030

(22) Filed: Aug. 19, 2002

(65) Prior Publication Data

US 2003/0051936 A1 Mar. 20, 2003

(30) Foreign Application Priority Data

Sep. 20, 2001 (JP) ........................................ 2001-286760

(51) Int. Cl.[7] .......................... B60R 21/34; B62D 25/12; G06F 17/00
(52) U.S. Cl. ........................... 180/274; 180/282; 701/45
(58) Field of Search ................................ 180/271, 274, 180/282; 701/45

(56) References Cited

U.S. PATENT DOCUMENTS

| | | | | |
|---|---|---|---|---|
| 5,521,822 A | * | 5/1996 | Wang | 701/45 |
| 5,559,697 A | * | 9/1996 | Wang | 701/45 |
| 6,332,115 B1 | * | 12/2001 | Nobusawa et al. | 702/142 |
| 6,516,278 B1 | * | 2/2003 | Ishizaki et al. | 702/33 |
| 6,600,412 B2 | * | 7/2003 | Ishizaki et al. | 340/436 |

FOREIGN PATENT DOCUMENTS

| | | |
|---|---|---|
| DE | 44 36 162 C1 | 3/1996 |
| DE | 197 36 840 A1 | 2/1999 |
| DE | 197 41 631 A1 | 3/1999 |
| DE | 198 11 865 A1 | 9/1999 |
| DE | 100 45 698 A1 | 5/2001 |
| DE | 100 04 088 a1 | 8/2001 |
| JP | 11-28994 | 2/1999 |
| JP | 11-142422 | * 5/1999 |

\* cited by examiner

*Primary Examiner*—Paul N. Dickson
*Assistant Examiner*—George D Spisich
(74) *Attorney, Agent, or Firm*—Merchant & Gould P.C.

(57) ABSTRACT

Values of vehicle speed signals sequentially output by a vehicle speed detection section are stored in a memory. Wheel slip detection section detects a slip of a vehicle wheel on the basis of the values of the vehicle speed signals stored in the memory and thereby outputs a wheel slip detection signal. Hood activation control section for controlling operation of a hood-lifting actuator activates the actuator even when the value of a current vehicle speed signal is smaller than a predetermined apparatus-activating vehicle speed value, on condition that the wheel slip signal has been received from the wheel slip detection section and that a collision detection signal has been received from a collision detection section.

6 Claims, 10 Drawing Sheets

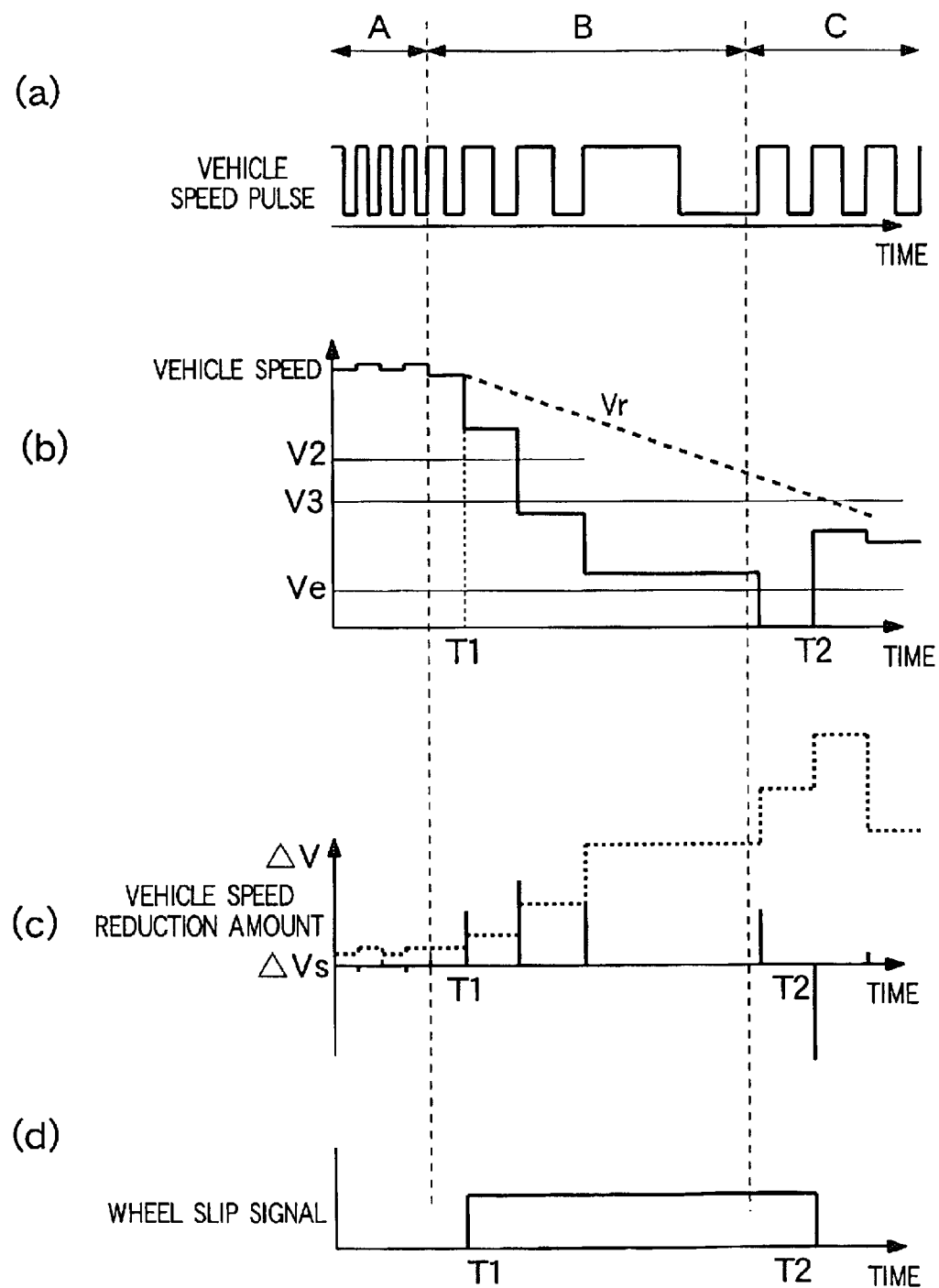

VEHICLE HOOD CONTROL APPARATUS

FIELD OF THE INVENTION

The present invention relates generally to apparatus for controlling operation of a vehicle hood, and more particularly to an improved vehicle hood control apparatus which, even when wheels of a vehicle uncontrollably slip due to sudden braking, allows the vehicle hood to operate properly for protection of a pedestrian or other external object at the time of a collision between the vehicle and the external object.

BACKGROUND OF THE INVENTION

Among examples of the conventional vehicle hood control apparatus is a pedestrian-protecting sensor system disclosed in Japanese Patent Laid-open Publication No. HEI-11-28994. The disclosed pedestrian-protecting sensor system includes at least one load sensor provided on or near a front bumper, and a vehicle speed sensor. Once the vehicle speed detected by the vehicle speed sensor has exceeded a predetermined speed value and characteristics of the output from the load sensor have met predetermined conditions, i.e. once a collision, against a pedestrian, of the vehicle has been detected while the vehicle is traveling at more than a predetermined speed, a flip-up mechanism is activated to flip up or lift a hood in order to protect the pedestrian through cushioning action of the hood.

The vehicle speed sensor in the disclosed sensor system is of a type that detects the vehicle speed on the basis of rotations of a wheel or wheel axle. Thus, when the vehicle wheels uncontrollably slip due to sudden braking applied by a human operator or driver of the vehicle to urgently avoid a collision with a certain external object (particularly, a pedestrian), the vehicle speed sensor would detect a vehicle speed considerably lower than an actual traveling speed of the vehicle, because the vehicle speed detection in this case is based on the rotations of the wheel or wheel axle. Therefore, controlling the operation of the vehicle hood on the basis of the vehicle speed determined from the rotations of the wheel or wheel axle tends to raise the possibility that the vehicle hood will not be activated properly even when predetermined conditions for activating the hood have been met. Namely, in such a case, the pedestrian-protecting sensor system would not run properly so as to afford sufficient protection of a pedestrian, even when the vehicle has collided with the pedestrian at a relatively high speed and the hood is expected to produce a considerable cushioning or damage-reducing effect.

SUMMARY OF THE INVENTION

In view of the foregoing prior art problems, it is an object of the present invention to provide an improved vehicle hood control apparatus which allows a vehicle hood to operate properly even when wheels of a vehicle slip due to sudden braking.

In order to accomplish the above-mentioned object, the present invention provides an improved vehicle hood control apparatus for use with a vehicle including a hood-lifting actuator. The vehicle hood control apparatus comprises: a vehicle speed detection section for detecting a vehicle speed on the basis of wheel rotation signals indicative of rotation of a given wheel of the vehicle and thereby outputting a vehicle speed signal; a collision detection section for detecting a collision, with an external object (particularly, a pedestrian), of the vehicle and thereby outputting a collision detection signal; a memory for storing values of a plurality of the vehicle speed signals sequentially output by the vehicle speed detection section; a wheel slip detection section for detecting an accidental slip of the wheel on the basis of the values of the vehicle speed signals stored in the memory and thereby outputting a wheel slip detection signal; and a hood activation control section for activating the hood-lifting actuator at least when a value of a current vehicle speed signal received from the vehicle speed detection section is equal to or greater than a predetermined apparatus-activating vehicle speed value, on condition that the collision detection signal has been received from the collision detection section. Even when the value of the current vehicle speed signal is smaller than the predetermined apparatus-activating vehicle speed value, the hood activation control section in the present invention activates the hood-lifting actuator, on condition that the wheel slip signal has been received from the wheel slip detection section and that the collision detection signal has been received from the collision detection section.

Namely, even when the value of the current vehicle speed signal, output by the vehicle speed detection section while a human operator of the vehicle is applying sudden braking, is smaller than the predetermined apparatus-activating vehicle speed value, the present invention can properly activate the hood-lifting actuator on condition that a slip of the given wheel has been detected on the basis of a variation in the vehicle speed signal values stored in the memory and that a collision of the vehicle has been detected by the collision detection section.

Preferably, in the vehicle hood control apparatus of the present invention, the vehicle speed detection section receives the wheel rotation signals to output the vehicle speed signal every predetermined time (i.e. at intervals of the predetermined time). The wheel slip detection section outputs the wheel slip signal, on condition that the value, stored in the memory, of the last vehicle speed signal output by the vehicle speed detection section the predetermined time before the current vehicle speed is equal to or greater than a predetermined vehicle speed value and that a vehicle speed reduction amount calculated on the basis of a difference between the values of the last and current vehicle speeds is greater than a predetermined wheel-slip-determining threshold value.

Because the vehicle speed is detected by the vehicle speed detection section every predetermined time, the vehicle speed reduction amount is also calculated at intervals of the predetermined time, and a determination about occurrence of a wheel slip (also referred to as a wheel slip determination) is made on the basis of both the thus-calculated vehicle speed reduction amount and the predetermined wheel-slip-determining threshold value. By the wheel slip detection section outputting wheel slip signals at intervals of the predetermined time, the vehicle hood control apparatus of the present invention can promptly detect occurrence of a wheel slip when the vehicle has encountered a collision with a certain external object (particularly, a pedestrian) with the vehicle speed signal value significantly lowered due to sudden braking, so that it can promptly activate the hood-lifting actuator. Further, in a case where the vehicle has collided with an external object due to a wheel slip at such a low vehicle speed (with the last vehicle speed signal below the predetermined value) that requires no activation of the hood-lifting actuator, the wheel slip detection section does not start outputting the wheel slip signal, so that the vehicle hood control apparatus can prevent or save unnecessary activation of the hood-lifting actuator.

In a preferred embodiment, the vehicle speed detection section receives pulses, representative of a changing vehicle speed, output by a pulse generation section that is provided on a rotating member of the wheel and, in response to reception of each of the pulses, it outputs the vehicle speed signal calculated on the basis of the length of an elapsed time from the reception, from the pulse generation section, of the preceding pulse. The wheel slip detection section outputs the wheel slip signal, on condition that the value, stored in the memory, of the last vehicle speed signal corresponding to the preceding pulse is equal to or greater than a predetermined vehicle speed value and that a vehicle speed reduction amount calculated on the basis of a difference between the values of the last and current vehicle speeds is greater than a predetermined wheel-slip-determining threshold value.

In this preferred embodiment, even when the current vehicle speed signal value is smaller than the apparatus-activating vehicle speed value due to a wheel slip caused by sudden braking, the occurrence of the wheel slip can be confirmed, on the basis of both the vehicle speed reduction amount calculated per cycle of the pulses and the predetermined wheel-slip-determining threshold value, so that the wheel slip signal is output from the wheel slip detection section. In this way, the hood-lifting actuator can be activated properly on the basis of both the wheel slip signal and the collision detection signal. Further, in a case where the vehicle has collided with an external object due to a wheel slip at such a low vehicle speed that requires no activation of the hood-lifting actuator, the wheel slip detection section does not start outputting the wheel slip signal, so that the vehicle hood control apparatus can prevent unnecessary activation of the hood-lifting actuator.

In another preferred embodiment of the present invention, the vehicle speed detection section receives pulses, representative of a changing vehicle speed, output by a plurality of pulse generation sections provided at uniform intervals on the rotating member of the wheel and, in response to reception of each of the pulses, it outputs the vehicle speed signal calculated on the basis of the length of an elapsed time from the reception, from the pulse generation section, of the preceding pulse. The wheel slip detection section outputs the wheel slip signal, on condition that the value, stored in the memory, of the last vehicle speed signal corresponding to the preceding pulse is equal to or greater than a predetermined vehicle speed value and that a vehicle speed reduction amount calculated on the basis of a difference between the values of the last and current vehicle speeds is greater than a wheel-slip-determining threshold value determined in accordance with the value of the last vehicle speed. Because the wheel-slip-determining threshold value determined in accordance with the value of the last vehicle speed, this embodiment can detect a wheel slip with even higher accuracy.

In a preferred embodiment, the wheel slip detection section terminates the output of the wheel slip signal, on condition that the value of the current vehicle speed is greater than the value of the last vehicle speed and that the value of the current vehicle speed is greater than a predetermined wheel-slip-terminating vehicle speed value.

In this preferred embodiment, when the vehicle speed is increasing and the value of the current vehicle speed signal is greater than the predetermined wheel-slip-terminating vehicle speed value, it is determined that the wheel slip has been brought to an end; thus, the embodiment can detect the termination of the wheel slip with high accuracy. Namely, the embodiment detect the termination of the wheel slip on condition that the vehicle speed has turned to an accelerating state and reached a predetermined speed value.

The wheel slip detection section in the present invention may includes: a timer for counting an output time of the wheel slip signal; and a vehicle speed estimation section for calculating an estimated current vehicle speed value of the vehicle, on the basis of 1) a value of the vehicle speed signal immediately before the occurrence of the wheel slip signal is output by the wheel slip detection section, 2) a predetermined vehicle speed reduction value and 3) the output time of the wheel slip signal counted by the timer. The wheel slip detection section terminates the output of the wheel slip signal, on condition that the estimated current vehicle speed value calculated by the vehicle speed estimation section has become equal to or smaller than a predetermined lower limit of the estimated current vehicle speed value.

Because the wheel slip detection section thus arranged terminates the output of the wheel slip signal once the estimated current vehicle speed value of the vehicle calculated by the vehicle speed estimation section has decreased to a predetermined low value range where the activation of the hood-lifting actuator is unnecessary, the embodiment of the invention can advantageously prevent the control apparatus from being unnecessarily kept active in response to the wheel slip signals for a long time.

BRIEF DESCRIPTION OF THE DRAWINGS

Certain preferred embodiments of the present invention will hereinafter be described in detail, by way of example only, with reference to the accompanying drawings, in which:

FIG. 11 is a diagram showing specific examples of variations over time of a vehicle speed, vehicle speed reduction amount and wheel slip signal in the second embodiment.

DETAILED DESCRIPTION OF THE PREFERRED EMBODIMENTS

It should be appreciated that various construction, shapes, positions, numerical values, etc. to be referred to in the following description are, in all aspects, just for illustrative purposes. Therefore, the present invention should never be construed as restricted to embodiments to be described hereinbelow, and it may be modified variously without departing from the scope defined by the appended claims.

Figure 1:
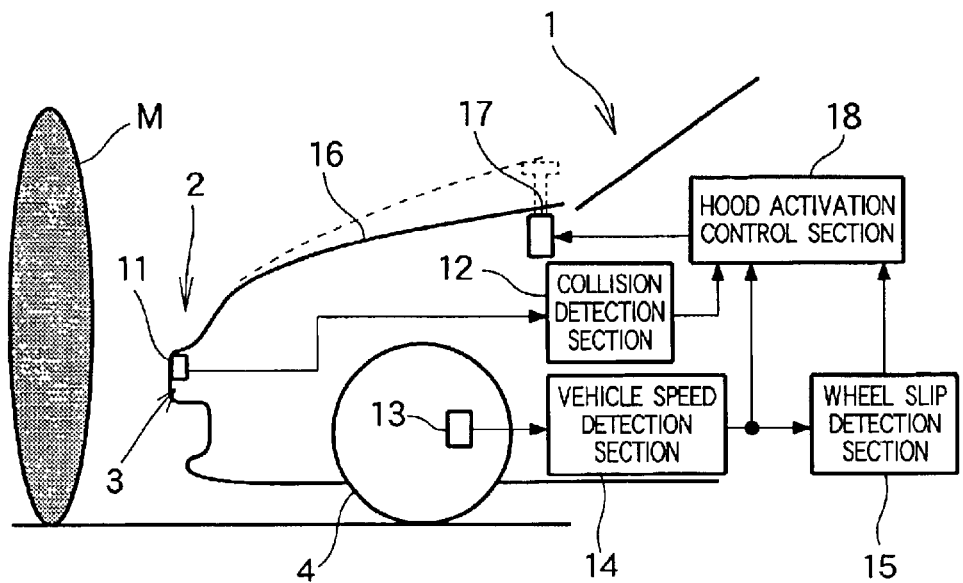
FIG. 1 is a block diagram showing an exemplary general setup of a vehicle hood control apparatus in accordance with a first embodiment of the present invention.

FIG. 1 is a block diagram showing an exemplary general setup of a vehicle hood control apparatus in accordance with a first embodiment of the present invention. The vehicle hood control apparatus includes a bumper sensor 11 for detecting a forward or rearward impact applied to a bumper 3 in a front end portion 2 of the vehicle 1 by a collision between the vehicle 1 and a certain external object M (particularly, a pedestrian), a collision detection section 12 for detecting the vehicle collision with the external object M, on the basis of the intensity of the impact detected via the bumper sensor 11, to thereby output a collision detection signal, and a wheel speed sensor 13 for outputting a predetermined number of pulses per rotation of a wheel 4 of the vehicle 1. The vehicle hood control apparatus also includes a vehicle speed detection section 14 for detecting a vehicle speed, on the basis of the pulses from the wheel speed sensor 13, to thereby output a vehicle speed signal, and a wheel slip detection section 15 for detecting a wheel slip, on the basis of values of a succession of the vehicle speeds, to thereby output a wheel slip signal. The vehicle hood control apparatus further includes a hood-lifting actuator 17 for flipping up or lifting a vehicle hood 16, and a hood activation control section 18 for outputting an activation signal to the actuator 17 in response to the vehicle speed signal, wheel slip signal and collision detection signal as will be later described. In the figure, a dotted line denotes the vehicle hood 16 lifted a predetermined amount by the actuator 17.

Figure 2:
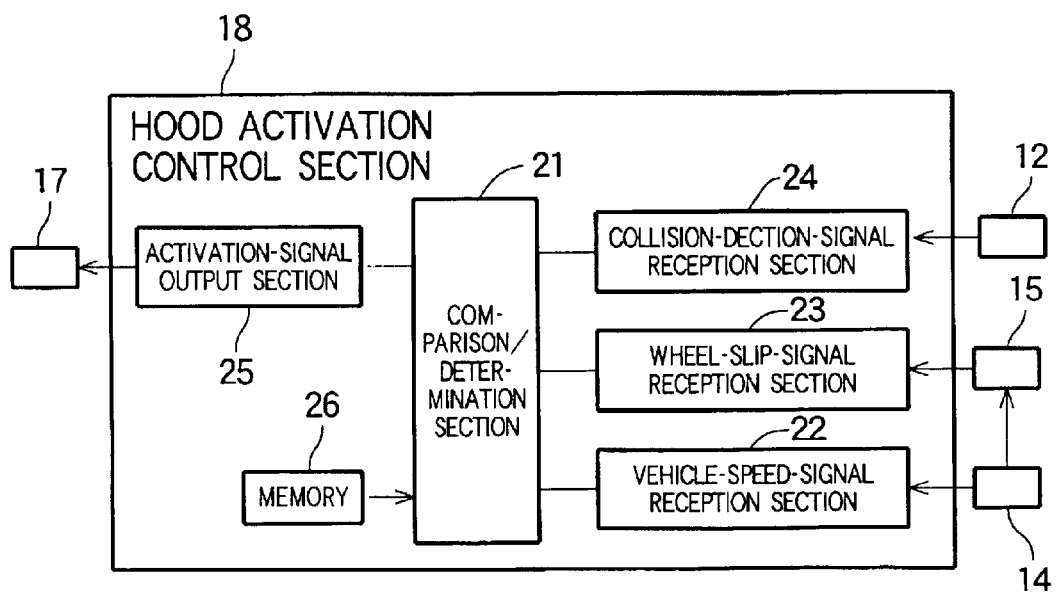
FIG. 2 is a block diagram showing details of a hood activation control section of the vehicle hood control apparatus of FIG. 1.

FIG. 2 is a block diagram showing details of the hood activation control section 18 of the vehicle hood control apparatus of the invention. As shown, the hood activation control section 18 includes a comparison/determination section 21, a vehicle-speed-signal reception section 22, a wheel-slip-signal reception section 23, a collision-detection-signal reception section 24, an activation-signal output section 25, and a memory 26 storing a predetermined apparatus-activating vehicle speed value. The comparison/determination section 21 compares a value of a current vehicle speed signal, received from the vehicle speed detection section 14 via the vehicle-speed-signal reception section 22, and the predetermined apparatus-activating vehicle speed value stored in the memory 26. When the current vehicle speed signal value is equal to or greater than the preset apparatus-activating vehicle speed value, the vehicle hood control apparatus is placed in a first state for awaiting reception, by the collision-detection-signal reception section 24, of the collision detection signal. Once the collision detection signal is received in such a first state, the comparison/determination section 21 outputs a first comparison result signal such that the activation-signal output section 25 outputs an activation signal to the hood-lifting actuator 17.

When, on the other hand, the current vehicle speed signal value is smaller than the predetermined apparatus-activating vehicle speed value, the vehicle hood control apparatus is placed in a second state for awaiting reception, by the wheel-slip-signal reception section 23, of the wheel slip signal. Once the wheel slip signal is received by the wheel-slip-signal reception section 23 and also the collision detection signal is received by the collision-detection-signal reception section 24 in such a second state, the comparison/determination section 21 outputs a second comparison result signal such that the activation-signal output section 25 outputs the activation signal to the hood-lifting actuator 17. In case a vehicle collision is detected when the current vehicle speed signal value is smaller than the predetermined apparatus-activating vehicle speed value with no wheel slip signal input to the hood activation control section 18, no activation signal is output from the activation-signal output section 25 to the hood-lifting actuator 17 so that the hood-lifting actuator 17 is left deactivated to keep the hood 16 in a non-lifted position. The following paragraphs describe operation of the vehicle hood control apparatus of the invention, with reference to FIGS. 2 and 3.

Figure 3:
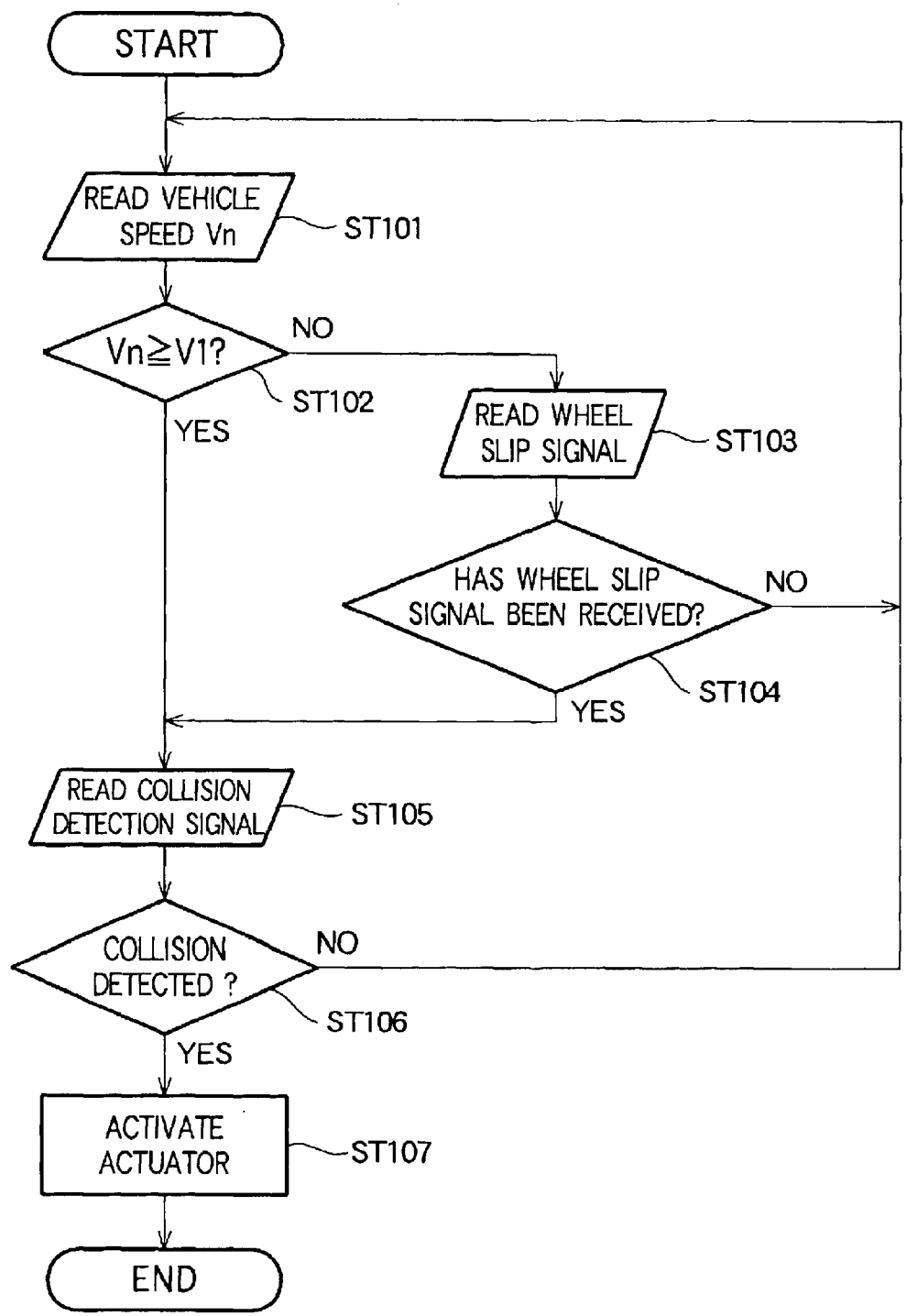
FIG. 3 is a flow chart showing an exemplary step sequence of processing performed by the vehicle hood control apparatus in accordance with the first embodiment of the present invention.

FIG. 3 is a flowchart showing an exemplary step sequence of processing performed by the vehicle hood control apparatus of the invention. Current vehicle speed Vn detected by the vehicle speed detection section 14 is received by the wheel slip detection section 15 and hood activation control section 18. Specifically, the current vehicle speed Vn detected by the vehicle speed detection section 14 is received and read by the vehicle-speed-signal reception section 22 in the control section 18, at step ST101. Then, at step ST102, the comparison/determination section 21 compares the read value of the current vehicle speed Vn and the predetermined apparatus-activating vehicle speed value V1 stored in the memory 26. If the value of the current vehicle speed Vn is equal to or higher than the preset apparatus-activating vehicle speed value V1 (Vn≧V1), the control apparatus proceeds via step ST105 to step ST106, where the comparison/determination section 21 makes a determination as to whether or not a collision detection signal has been received from the collision detection section 12. If, on the other hand, the current vehicle speed Vn is lower than the predetermined apparatus-activating vehicle speed value V1, the control apparatus branches to step ST103.

At step ST103, the wheel-slip-signal reception section 23 receives and reads a wheel slip signal transmitted from the wheel slip detection section 15. Then, at step ST104, the comparison/determination section 21 determines whether or not a wheel slip signal has been received from the wheel slip detection section 15. If answered in the affirmative at step ST104, the control apparatus goes to step ST105. However, if no wheel slip signal has been received as determined at step ST104, the control apparatus reverts to step ST101.

At step ST105, the collision-detection-signal reception section 24 receives a collision detection signal transmitted from the collision detection section 12. Then, at step ST106, the comparison/determination section 21 determines whether or not the collision detection signal has been received. If answered in the affirmative at step ST106, the control apparatus goes to step ST107, where an activation signal is output from the activation-signal output section 25 to the hood-lifting actuator 17 so that the vehicle hood 16 is lifted by the activation of the hood-lifting actuator 17. However, if no collision detection signal has been received from the collision detection section 12 as determined at step ST106, there is no need to activate the vehicle hood 16, and thus the control apparatus reverts to step ST101 to read a new vehicle speed Vn.

Figure 4:
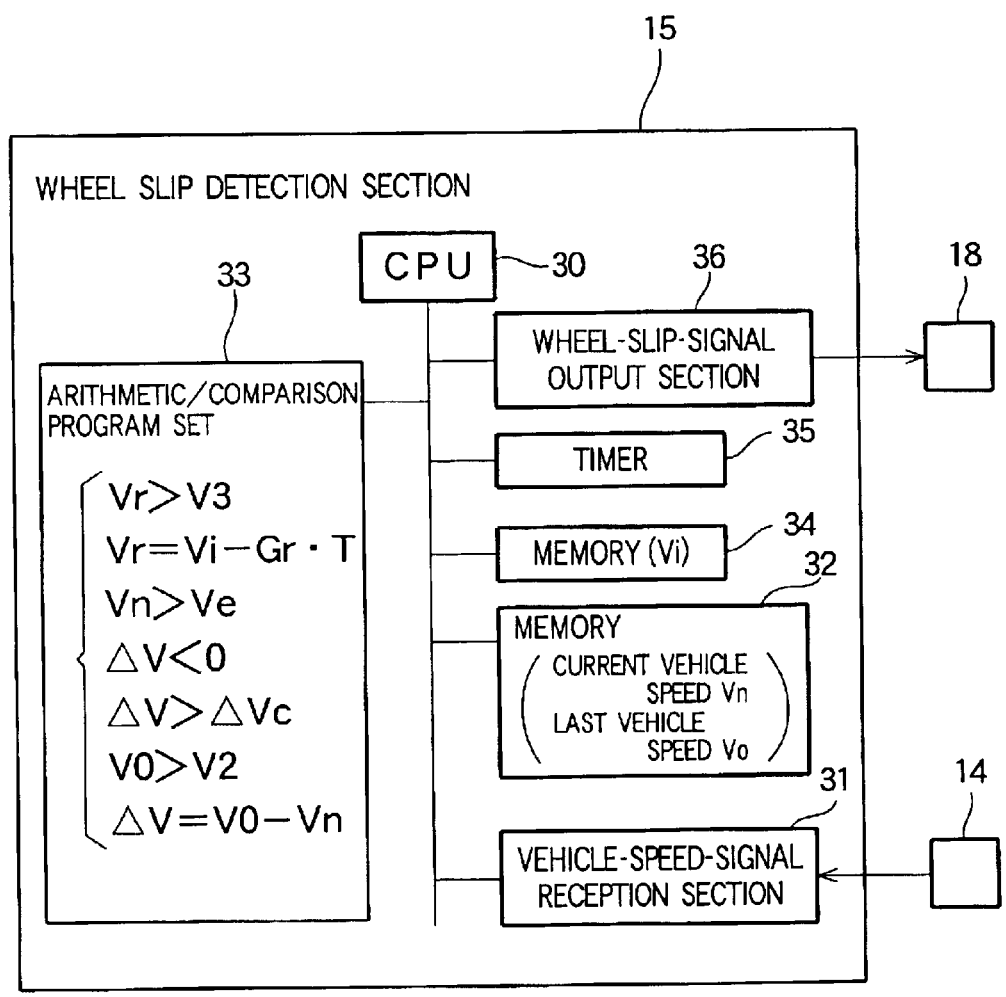
FIG. 4 is a block diagram schematically showing an example of a detailed setup of a wheel slip detection section in the first embodiment.

FIG. 4 is a block diagram schematically showing a detailed setup of the wheel slip detection section 15 which is constructed to perform a wheel slip detection process as will be detailed later. The wheel slip detection section 15 in the first embodiment includes a CPU 30 that controls various operations to be carried out in the detection section 15. To the CPU 30 are connected a vehicle-speed-signal reception section 31, a memory 32 for storing values of the current vehicle speed Vn and last vehicle speed V0, a memory 34 for storing an arithmetic/comparison program set 33 and a vehicle speed immediately before occurrence of a wheel slip (i.e.,immediately-before-slip vehicle speed) Vi, a timer 35 for counting a wheel-slip-signal output time and a wheel-slip-signal output section 36.

The vehicle-speed-signal reception section 31 receives vehicle speeds, sequentially detected by the vehicle speed detection section 14 at the predetermined time intervals; that is, the vehicle-speed-signal reception section 31 receives the detected vehicle speeds at predetermined time intervals. Each vehicle speed newly received from the vehicle speed detection section 14 via the reception section 31 is stored in the memory 32 as the current vehicle speed Vn. Namely, the current vehicle speed Vn and last vehicle speed V0 stored in the memory 32 are updated at the predetermined time intervals. Here, the current vehicle speed Vn represents a newest vehicle speed value, while the last vehicle speed V0 represents a vehicle speed value received the predetermined time before the current vehicle speed Vn.

The calculation/comparison program set 33 contains a plurality of arithmetic programs and comparison programs to be processed by the CPU 30, as will be later described in detail. The memory 34 stores an immediately-before-slip vehicle speed, i.e. a vehicle speed detected immediately before a wheel slip signal is output from the wheel-slip-signal output section 36.

The wheel-slip-signal output section 36 initiates and terminates the output of the wheel slip signal when the CPU 30 determines, by execution of any of the arithmetic and comparison programs, that predetermined conditions have been met. At the same time the wheel-slip-signal output section 36 starts outputting the wheel slip signal in accordance with a result of a wheel slip determination made by the CPU 30, the timer 35 starts counting an output time of the wheel slip signal. The following paragraphs describe in greater detail the wheel slip detection process performed by the detection section 15.

Figure 5:
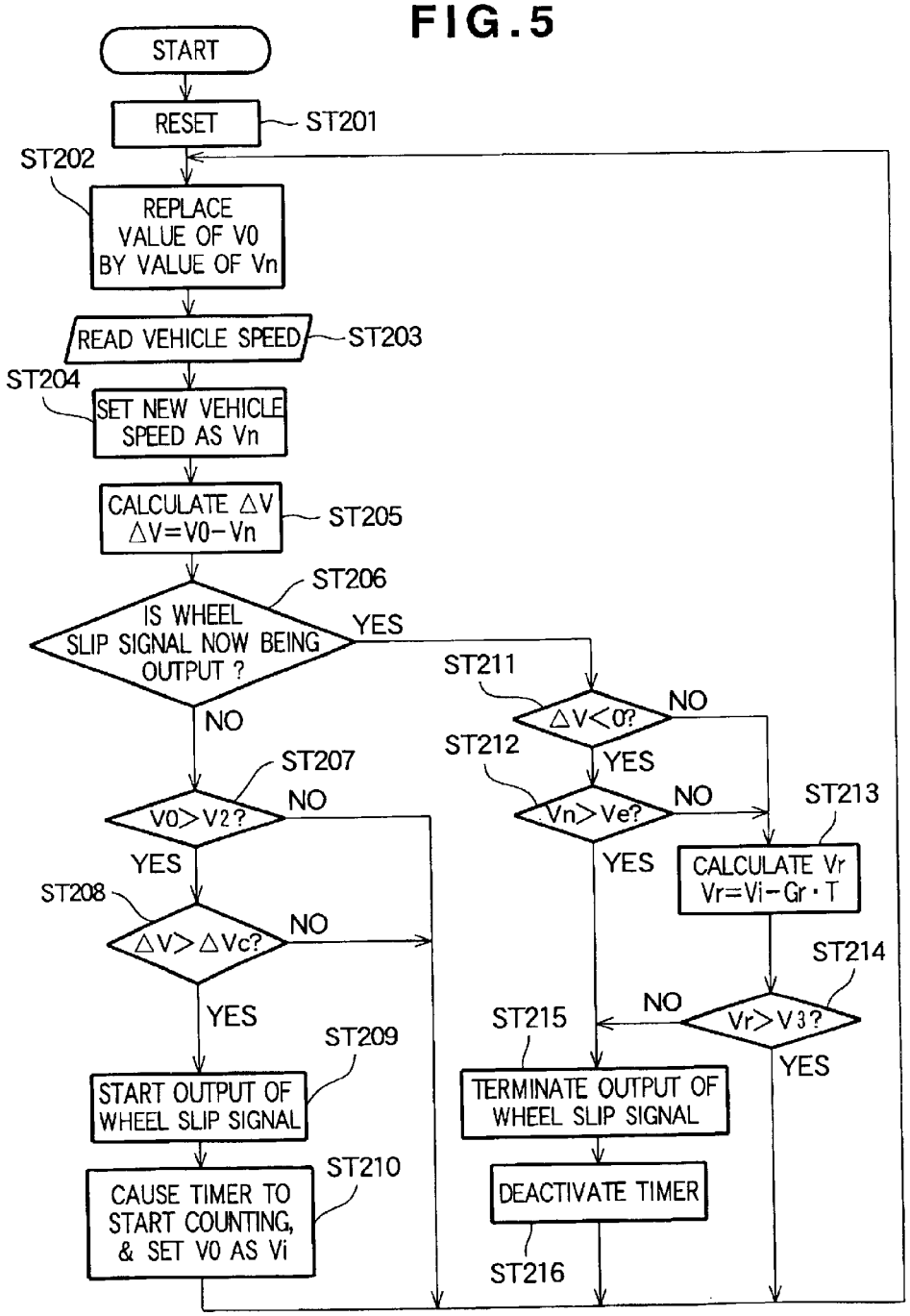
FIG. 5 is a flowchart showing an exemplary step sequence of a process performed by the wheel slip detection section in the first embodiment.

FIG. 5 is a flowchart showing an exemplary step sequence of the wheel slip detection process performed by the CPU 30 of the detection section 15. First, at step ST201, various variables to be used in the wheel slip detection process, such as the current vehicle speed Vn, last vehicle speed V0, immediately-before-slip vehicle speed Vi, vehicle speed reduction amount $\Delta V$ and output time T of the wheel slip signal, are each reset to an initial value "0". At next step ST202, the value of the last vehicle speed V0 currently stored in the memory 32 is replaced by the currently-stored value of the current vehicle speed Vn. Then, at step ST203, the vehicle-speed-signal reception section 31 receives a vehicle speed newly detected by the vehicle speed detection section 14, and the CPU 30 reads the newly-received vehicle speed. The value of the thus-read new vehicle speed is stored in the memory 32 as a new value of the current vehicle speed Vn, at step ST204. Such operations of steps ST202 to ST204 allow the values of the current vehicle speed Vn and last vehicle speed V0 in the memory 32 to be updated each time a new vehicle speed is read by the wheel slip detection section 15.

Then, at step ST205, a vehicle speed reduction amount $\Delta V$ is calculated in accordance with a mathematical expression of "$\Delta V = V0 - Vn$" defined by one of the arithmetic programs in the arithmetic/comparison program set 33.

Then, the CPU 30, at step ST206, determines whether or not the wheel slip signal is now being output via the wheel-slip-signal output section 36. If the wheel slip signal is now being output as determined at step ST206, the CPU 30 proceeds to step ST211; otherwise, the CPU 30 goes to step ST207.

Specifically, the following operations are carried out when no wheel slip signal is now being output as determined at step ST206. At step ST207, the CPU 30 makes a determination, in accordance with one of the comparison programs, as to whether the last vehicle speed V0 is greater than a predetermined slip-determination-responsive activating speed V2 (V0>V2). If so (YES determination), the CPU 30 moves on to step ST208, but if the last vehicle speed V0 is not greater than the predetermined slip-determination-responsive activating speed V2, the CPU 30 loops back to step ST201 to read a new vehicle speed.

At step ST208, the CPU 30 makes a further determination, in accordance with another one of the comparison programs, as to whether the vehicle speed reduction amount $\Delta V$ is greater than a predetermined wheel-slip-determining threshold value $\Delta Vc$ ($\Delta V > \Delta Vc$). If so (YES determination), the CPU 30 judges that there has occurred a wheel slip and then moves on to step ST209. If, on the other hand, the vehicle speed reduction amount $\Delta V$ is not greater than the predetermined wheel-slip-determining threshold value $\Delta Vc$, the CPU 30 judges that no wheel slip has occurred and then the CPU 30 loops back to step ST201 to read a new vehicle speed.

Once the CPU 30 judges that there has occurred a wheel slip by step ST208 above, the wheel-slip-signal output section 36 starts outputting a wheel slip signal at step ST209, and simultaneously the timer 35 starts counting the output time of the wheel slip signal. The value of the last vehicle speed V0 at that time point is stored in the memory 34 as an immediately-before-slip vehicle velocity Vi at step ST210.

On the other hand, the following operations are carried out when the wheel slip signal is now being output via the wheel-slip-signal output section 36 as determined at step ST206. Note that the determination at ST206 becomes affirmative only after steps ST209 and ST210 have been taken; that is, the affirmative determination is made at ST206 when the wheel is currently slipping and the timer 35 has already started counting the output time of the wheel slip signal.

At step ST211, the CPU 30 makes a further determination, in accordance with still another one of the comparison programs, as to whether the vehicle speed reduction amount $\Delta V$ is of a negative value ($\Delta V < 0$). If the vehicle speed reduction amount $\Delta V$ is of a negative value as determined at step ST211, it means that the vehicle speed value is increasing, i.e. the rotating speed of the wheel is increasing, so that the CPU 30 moves on to step ST212. But, if vehicle speed reduction amount $\Delta V$ is equal to or greater than the zero value as determined at step ST211, the CPU 30 goes to step ST213.

At step ST212, the CPU 30 makes a further determination, in accordance with yet another one of the comparison programs, as to whether the current vehicle speed Vn is higher than a predetermined slip-terminating vehicle speed Ve (Vn>Ve). Here, the slip-terminating vehicle speed Ve is such a very low vehicle speed from which it is barely possible to detect that the wheel is rotating.

If the current vehicle speed Vn is higher than the predetermined slip-terminating vehicle speed Ve as determined at step ST212, the CPU 30 proceeds to step ST215, but if the current vehicle speed Vn is equal to or lower than of the predetermined slip-terminating vehicle speed Ve, then the CPU 30 goes to step ST213, where an estimated current vehicle speed Vr is calculated. Specifically, at step ST213, the estimated current vehicle speed Vr is calculated, in accordance with a mathematical expression of "Vr=Vi−Gr× T" defined by still another one of the arithmetic programs of the arithmetic/comparison program set 33, using the immediately-before-slip vehicle velocity Vi and output time T of the wheel slip signal stored in the memory 34 and a predetermined vehicle speed reduction value Gr.

Here, the vehicle speed reduction value Gr represents a vehicle speed reduction value during a slip of the wheel caused by sudden braking. This vehicle speed reduction value Gr depends on a friction coefficient between the tire of the wheel and a road surface, and it is preferable that the vehicle speed reduction value Gr be set assuming a frozen road surface, one of the most slippery road surfaces.

At next step ST214, the CPU 30 makes a further determination, in accordance with still another one of the comparison programs, as to whether the estimated current vehicle speed Vr is higher than a predetermined lower limit value V3 of the estimated current vehicle speed (Vr>V3). If the estimated current vehicle speed Vr is higher than the predetermined lower limit value V3, the CPU 30 reverts to step ST201, but if the estimated current vehicle speed Vr is equal to or lower than the predetermined lower limit value V3, then the CPU 30 proceeds to step ST215. At step ST215, the CPU30 causes the wheel-slip-signal output section 36 to stop outputting the wheel slip signal. At the same time, the CPU 30 causes the timer 35 to stop counting the output time of the wheel slip signal, at step ST216. The output, from the wheel-slip-signal detection section 36, of the wheel slip signal is initiated and then terminated through the above-described operations.

In the instant embodiment, the following relationships are established among the slip-determining threshold value ΔVc, apparatus-activating vehicle speed value V1, slip-determination-responsive activating speed V2 and lower limit value V3 of the estimated current vehicle speed that are used in the wheel slip detection process. Namely, the occurrence of the wheel slip is confirmed in the embodiment by ascertaining that the reduction rate (negative acceleration) of the vehicle speed has exceeded a maximum speed reduction rate (e.g., about 9.8 m/s$^2$) normally conceivable from the friction coefficient between the tire and the road surface. If the speed reduction rate to be used as a criterion for the wheel slip determination is given as "Gs", the slip-determining threshold value ΔVc is set to equal a product of "Gs×Δt"; here, "Δt" represents a vehicle-speed detecting period of the vehicle speed detection section 14.

Also, the slip-determination-responsive activating speed V2 is set to be equal to or lower than the apparatus-activating vehicle speed value V1 (V2≦V1), in order to avoid activation failure of the vehicle hood due to a wheel slip at the apparatus-activating vehicle speed V1 or over. Further, the lower limit value V3 of the estimated current vehicle speed is set to be equal to or lower than the slip-determination-responsive activating speed V2 (V3≦V2) to permit activation of the vehicle hood in response to the calculated estimated current vehicle speed Vr.

Figure 6:
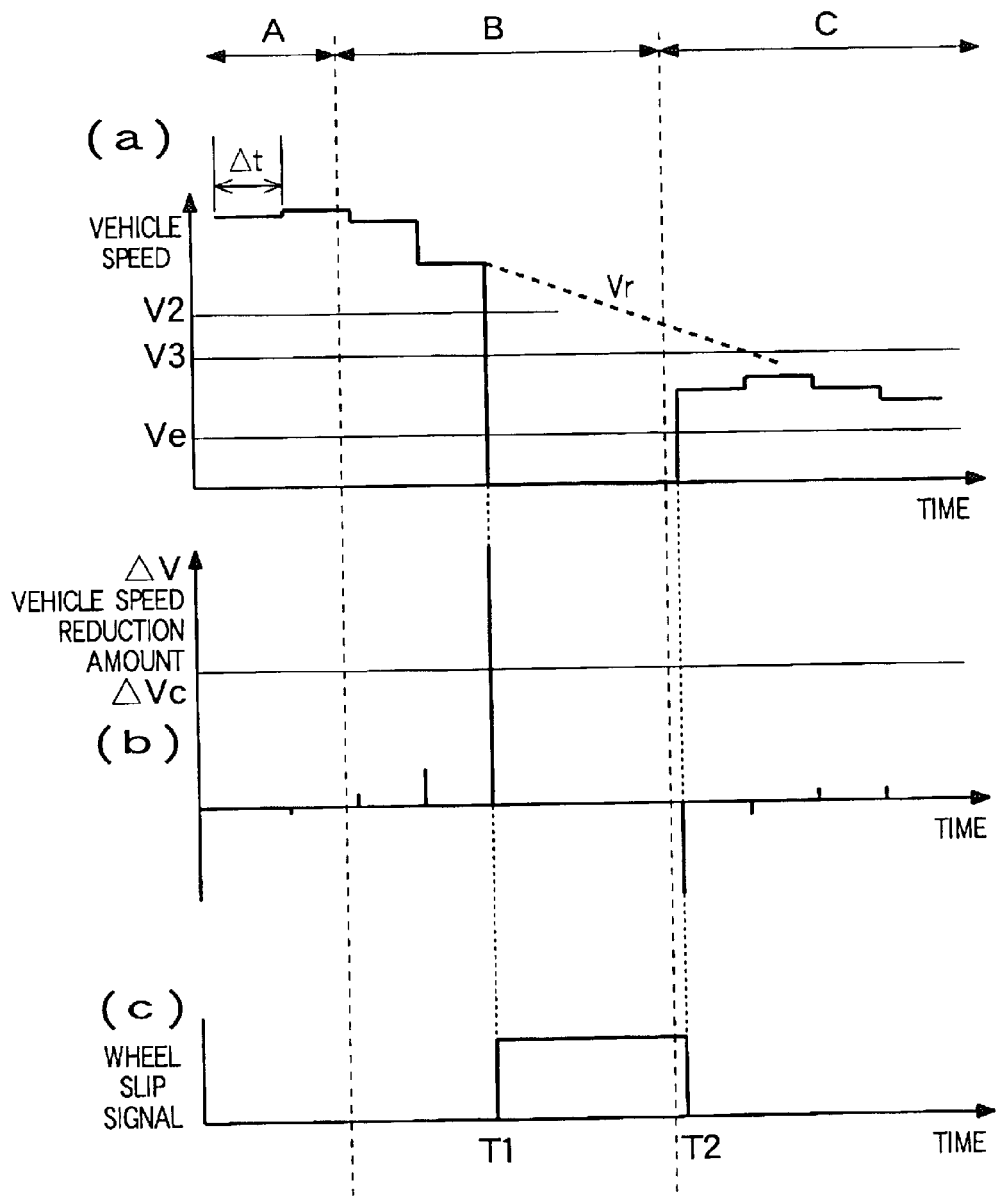
FIG. 6 is a diagram showing specific examples of variations over time of a vehicle speed, vehicle speed reduction amount and wheel slip signal in the first embodiment.

Next, a description will be made about initiation and termination of the output of the wheel slip signal in the first embodiment, with reference to FIG. 6 showing specific examples of variations over time of the vehicle speed, vehicle speed reduction amount and wheel slip signal. More specifically, (a) of FIG. 6 shows a variation over time of the (detected) vehicle speed (vehicle speed signal value) detected via the wheel speed sensor every predetermined time Δt when a wheel slip is caused by sudden braking, (b) a variation over time of the vehicle speed reduction amount ΔV calculated by the wheel slip detection section 15, and (c) a variation over time of the wheel slip signal output from the wheel slip detection section 15.

In FIG. 6, "A" represents a time section where the vehicle is traveling at a substantially constant speed. Because of the substantially constant speed, there is almost no vehicle speed reduction amount ΔV. "B" represents a time section where the vehicle speed deceases rapidly due to the wheel slip caused by the sudden braking. Because there occurs almost no slip amount at the beginning of the braking, an actual traveling speed of the wheel and the vehicle speed detected by the wheel speed sensor (i.e., sensor-detected vehicle speed) decrease practically similarly to each other. In this condition, some vehicle speed reduction amount ΔV is encountered; however, this vehicle speed reduction amount ΔV does not exceed the predetermined wheel-slip-determining threshold value ΔVc.

Then, once the wheel slip amount increases to a considerable degree to produce a great difference between the actual traveling speed of the vehicle and the sensor-detected vehicle speed (vehicle speed signal value), the sensor-detected vehicle speed decreases sharply as seen at time point T1 of FIG. 6, which indicates that the vehicle is traveling while slipping on the road surface despite a small number of the wheel rotations. If the brakes are left put on (left unloosened), the wheel comes to a non-rotating state, so that the sensor-detected vehicle speed becomes zero as seen at and after time point T1 (see a latter half of the "B" time section in (a) of FIG. 6).

At time point T1, where the last vehicle speed V0 is higher than the slip-determination-responsive activating speed V2 and also the vehicle speed reduction amount ΔV is greater than the wheel-slip-determining threshold value ΔVc, the occurrence of the wheel slip is detected so that the output of a wheel slip signal is initiated. In response to the detection of the wheel slip, the wheel slip detection section 15 starts calculating an estimated current vehicle speed Vr as denoted by an oblique dotted line in (a) of FIG. 6.

Further, "C" represents a time section where the vehicle speed is increasing during the wheel slip in response to loosening of the brakes. At time point T2, the vehicle speed increases to approach the actual traveling speed of the vehicle, by the loosening of the brakes. In this condition, because the vehicle speed reduction amount ΔV takes on a negative value and the vehicle speed exceeds the wheel-slip-terminating vehicle speed Ve, it is determined that the wheel slip has been brought to an end, so that the output of the wheel slip signal is terminated. In this case, the estimated current vehicle speed Vr is not taken into consideration in the vehicle hood control, since the vehicle speed exceeds the slip-terminating vehicle speed Ve before the estimated current vehicle speed Vr becomes lower than the lower limit value V3 of the estimated current vehicle speed. In the above-described manner, the instant embodiment can accurately detect the occurrence and termination of each wheel slip.

Next, a description will be made about initiation and termination of the output of the wheel slip signal in accordance with a modification of the first embodiment, with reference to FIG. 7. More specifically, (a) of FIG. 7 shows a variation over time of the vehicle speed detected every predetermined time Δt when a wheel slip is caused by sudden braking, (b) a variation over time of the vehicle speed reduction amount ΔV calculated by the wheel slip detection section 15, and (c) a variation over time of the wheel slip signal output from the wheel slip detection section 15.

Figure 7:
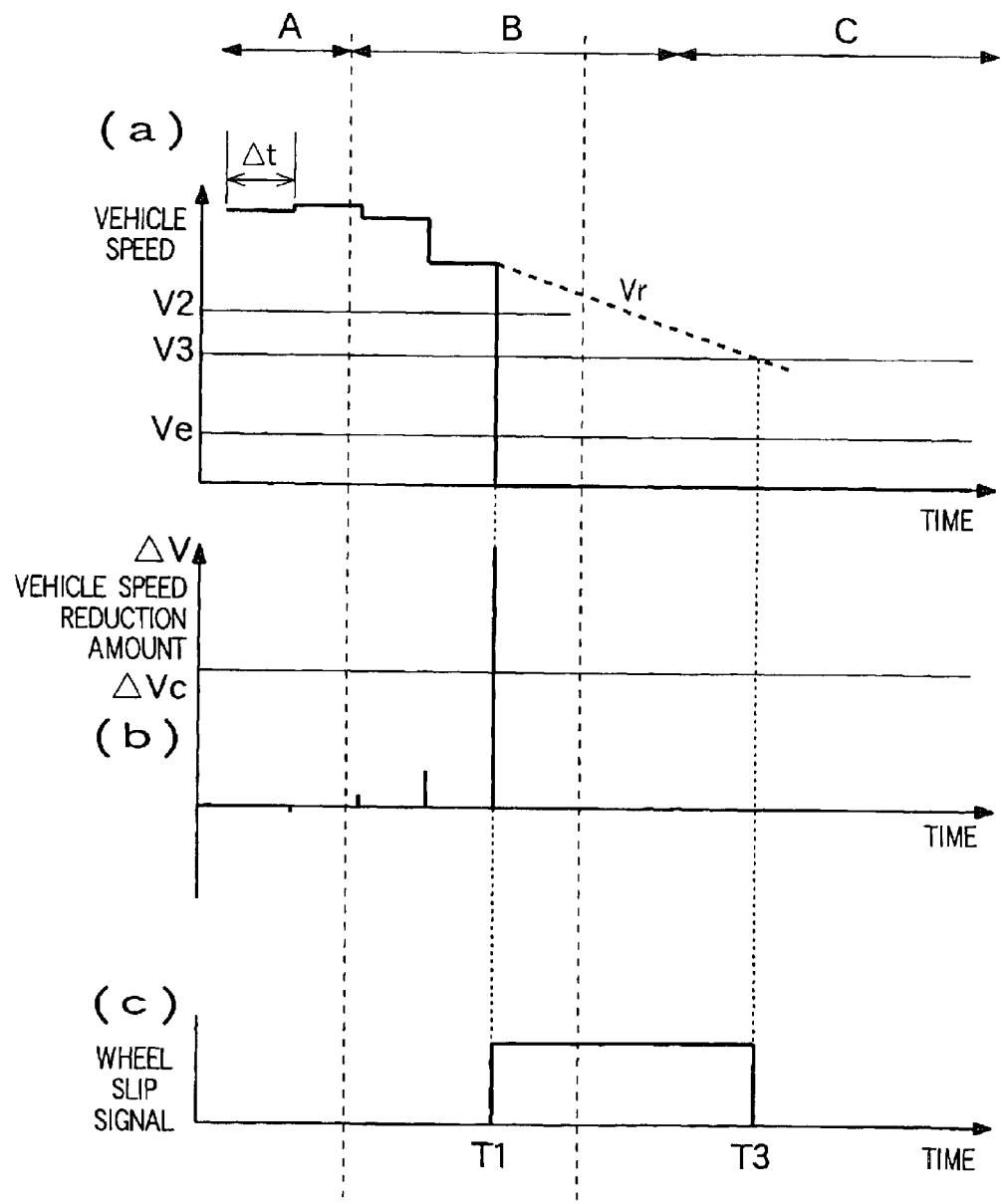
FIG. 7 is a diagram showing other specific examples of the variations over time of the vehicle speed, vehicle speed reduction amount and wheel slip signal in the first embodiment.

In FIG. 7, "A" represents a time section where the vehicle is traveling at a substantially constant speed. Because of the substantially constant speed, there is produced almost no vehicle speed reduction amount ΔV. "B" represents a time section where the vehicle speed deceases rapidly due to the wheel slip caused by the sudden braking. At time point T1, where the last vehicle speed V0 is higher than the slip-determination-responsive activating speed V2 and also the vehicle speed reduction amount ΔV is greater than the wheel-slip-determining threshold value ΔVs, the occurrence of the wheel slip is detected so that the output of a wheel slip signal is initiated. In response to the initiation of the wheel slip signal output, the wheel slip detection section 15 starts calculating an estimated current vehicle speed Vr as denoted by an oblique dotted line in (a) of FIG. 7.

Further, "C" represents a time section where the wheel is kept in a non-rotating state because the brakes are not loosened even after the occurrence of the wheel slip. With the brakes kept put on, the vehicle speed continues to be zero and the wheel slip signal continues to be output. But, once it is determined that the estimated current vehicle speed Vr has become equal to or lower than the lower limit value V3 of the estimated current vehicle speed, the output of the wheel slip signal is terminated (at time point T3 in FIG. 7). Thus, even in the case where the vehicle speed continues to be zero with the brakes left unloosened and thus termination of the wheel slip is not detected, it is possible to prevent the wheel slip signal from being output unnecessarily for a long time.

Whereas the first embodiment has been described as determining the estimated current vehicle speed vr and terminating the output of the wheel slip signal when the determined estimated current vehicle speed Vr has become equal to or lower than the lower limit value V3 of the estimated current vehicle speed, the output of the wheel slip signal may be terminated when a condition of "T>(Vi−V3)/G" has been satisfied on the basis of the comparisons "Vr=Vi−Gr×T and "Vr>V3". Since the lower limit value V3 of the estimated current vehicle speed and the vehicle speed reduction value Gr are constants, timing T for terminating the output of the wheel slip signal can be calculated if only the immediately-before-slip vehicle speed Vi is given.

The first embodiment is particularly useful where the wheel speed sensor 13 be of a type capable of detecting a changing wheel rotating speed with resolution as high as that of a wheel speed sensor conventionally employed in the ABS (Anti-lock Braking System) control (e.g., dozens of output pulses per rotation of the wheel). In this case, the vehicle speed detection section 14 may be designed to detect a vehicle speed on the basis of a value obtained by counting the output pulses from the wheel speed sensor 13 at predetermined time intervals (e.g., every few milliseconds), by detecting a frequency of the pulses every few milliseconds, or otherwise.

The following paragraphs describe a second embodiment of the present invention which is similar to but different from the first embodiment in construction and operation of the wheel slip detection section.

Figure 8:
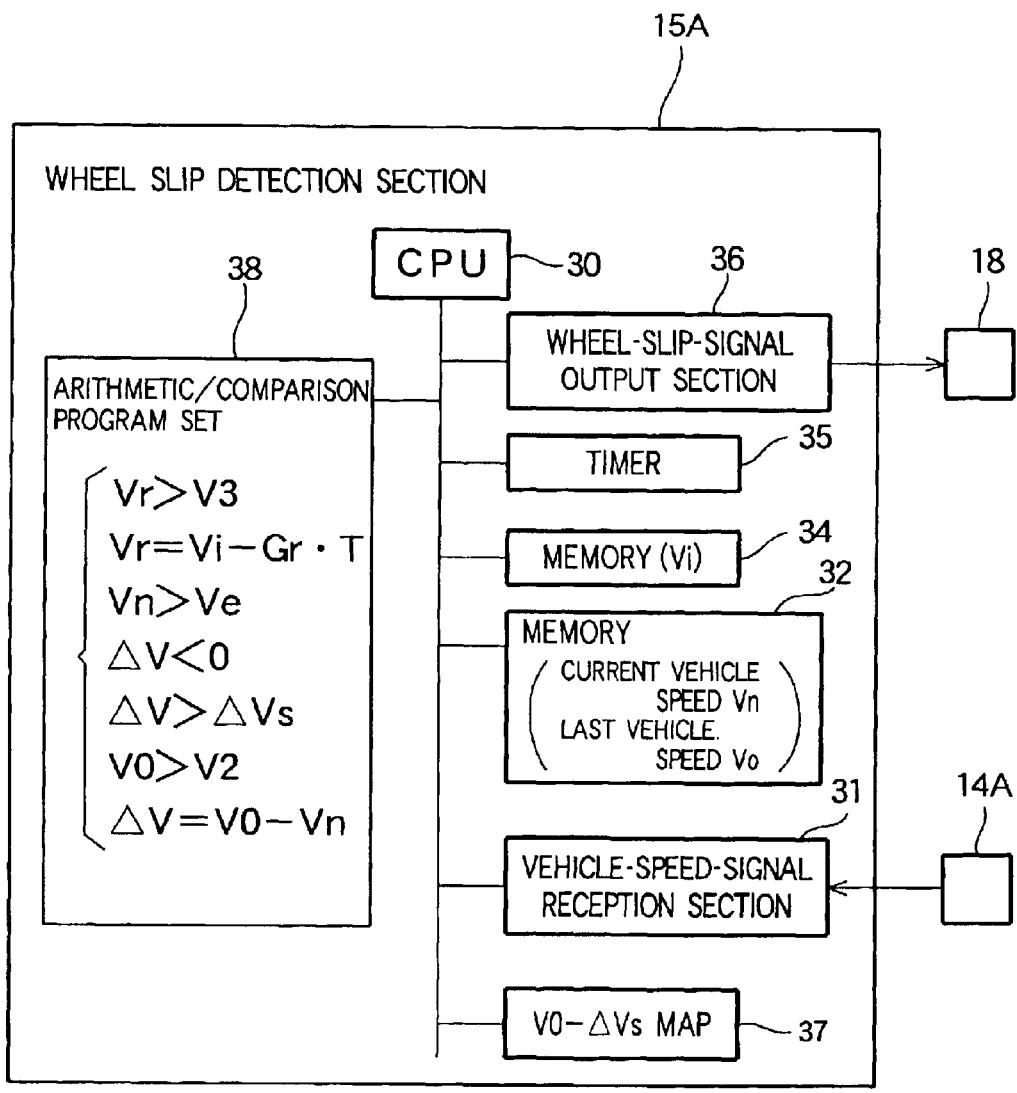
FIG. 8 is a block diagram schematically showing a second embodiment of the present invention, which particularly shows a detailed setup of a wheel slip detection section employed in the second embodiment.

FIG. 8 is a block diagram schematically showing a detailed setup of the wheel slip detection section 15A employed in the second embodiment. The wheel slip detection section 15A includes a CPU 30 that controls various operations to be carried out in the detection section 15A. To the CPU 30 are connected a vehicle-speed-signal reception section 31, a memory 32 for storing a current vehicle speed Vn and last vehicle speed V0, a memory 34 for storing an arithmetic/comparison program set 38 and an immediately-before-slip vehicle speed Vi, a timer 35 for counting a wheel-slip-signal output time, a wheel-slip-signal output section 36 and a V0−ΔVs map 37. Note that elements similar to those of the first embodiment shown in FIG. 4 are denoted by the same reference characters as in FIG. 4 and description of some of the elements will be omitted as appropriate to avoid unnecessary duplication.

Each time an output pulse from the wheel speed sensor 13 is received by the vehicle speed detection section 14A, the vehicle speed detection section 14A calculates a vehicle speed on the basis of an elapsed time from the reception time of the preceding pulse and the reception time of the current pulse, and it outputs a vehicle speed signal indicative of the thus-calculated vehicle speed. Namely, only when the pulse has been input from the wheel speed sensor 13, the vehicle speed detection section 14A outputs the vehicle speed signal. The vehicle speed reception section 31 receives the vehicle speed signal that is output from the vehicle speed detection section 14A in response to the reception of each pulse output from the sensor 13. Each time the output pulse from the wheel speed sensor 13 is received by the wheel slip detection section 15A, the values of the current and last vehicle speeds Vn stored in the memory 32 are updated. The V0−ΔVs map 37 is used to set a wheel-slip-determining threshold value Δvs in accordance with the value of the last vehicle speed V0.

Figure 9:
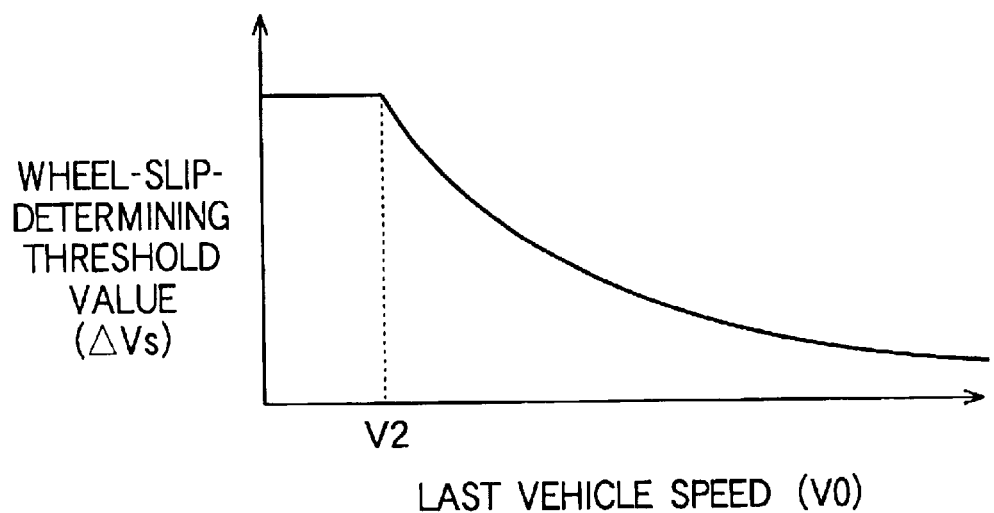
FIG. 9 is a diagram explanatory of a V0–ΔVs map used in the wheel slip detection section of FIG. 8.

The V0−ΔVs map 37 has characteristics as illustrated in FIG. 9. As illustrated, whereas the wheel-slip-determining threshold value ΔVs is basically set to such a characteristic that it becomes smaller as the last vehicle velocity V0 increases, the wheel-slip-determining threshold value ΔVs is set to be constant when the last vehicle velocity V0 is below the slip-determination-responsive activating speed V2, for the following reasons.

In the second embodiment, where the vehicle velocity output from the vehicle speed detection section 14A is updated each time the vehicle speed pulse is input, the vehicle velocity is not updated for a relatively long time when the vehicle speed is relatively low, although it is updated at short time intervals when the vehicle speed is relatively high. Thus, in the relationship "ΔVs=Gs×Δt" between the vehicle speed reduction rate Gs to be used as a criterion for wheel slip determination and the wheel-slip-determining threshold value ΔVs, the vehicle-speed detecting cycle of the vehicle speed detection section 14A, represented by "Δt", becomes relatively long when the vehicle speed is low, but becomes relatively short when the vehicle speed is high. For such reasons, the wheel-slip-determining threshold value ΔVs is set to the characteristics as illustrated in FIG. 9 so as to keep the vehicle speed reduction rate Gs constant.

Figure 10:
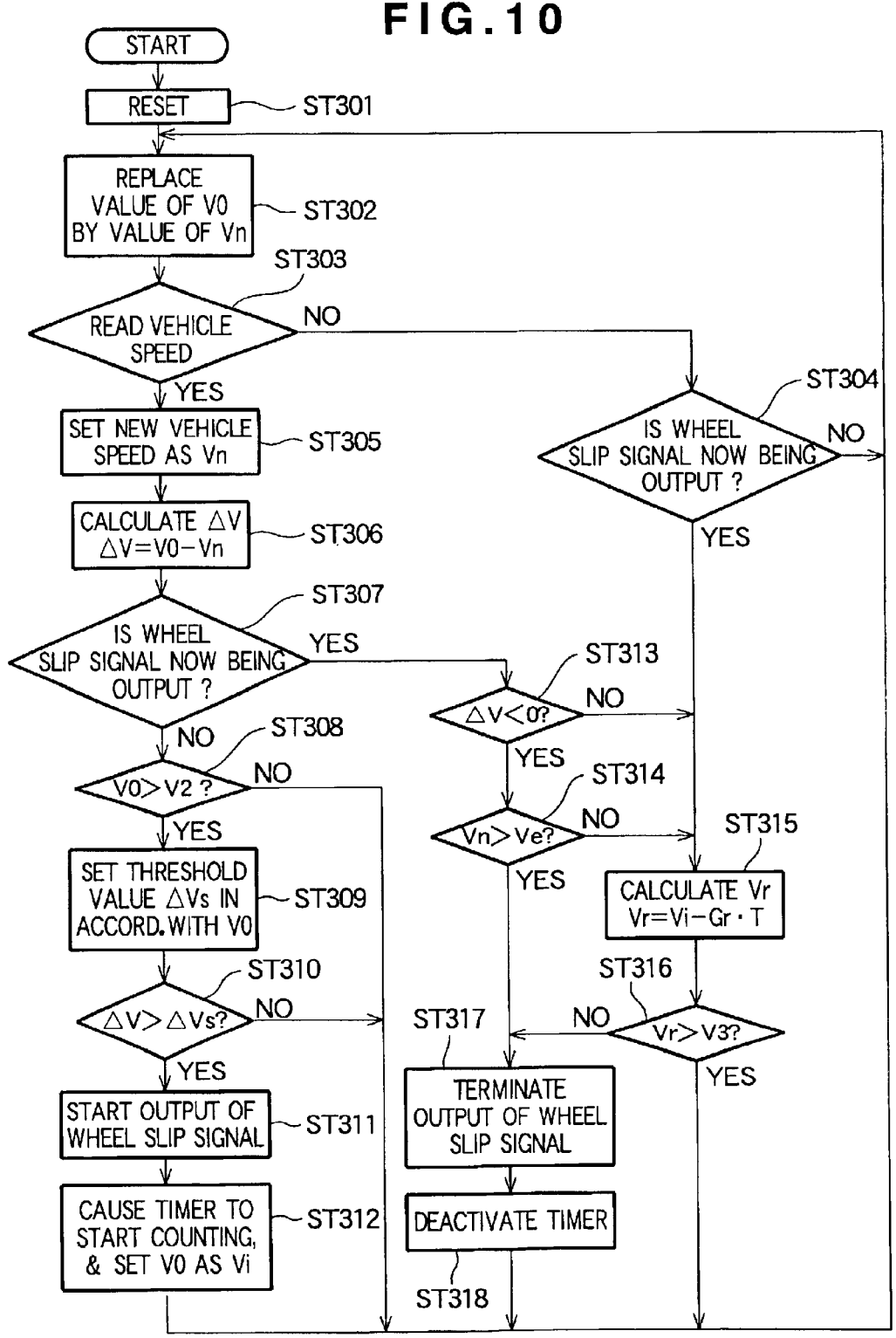
FIG. 10 is a flowchart showing an exemplary step sequence of a process performed by the wheel slip detection section in the second embodiment.

The following paragraphs describe a process performed by the thus-arranged wheel slip detection section 15A in the second embodiment of the invention, with reference to FIG. 10. FIG. 10 is a flowchart showing an exemplary step sequence of the process performed by the wheel slip detection section 15A in the second embodiment. First, at step ST301, various variables to be used in the wheel slip detection process, such as the current vehicle speed Vn, last vehicle speed V0, immediately-before-slip vehicle speed Vi, vehicle speed reduction amount ΔV and output time T, are each initialized to a value "0". At next step ST302, a currently-stored value of the last vehicle speed V0 in the memory 32 is replaced by a currently-stored value of the current vehicle speed Vn. Then, at step ST303, a newest vehicle speed detected by the vehicle speed detection section 14A is received via the vehicle speed reception section 31 and read by the CPU 30. Upon completion of the reading of the newest vehicle speed, the CPU 30 proceeds to step ST305.

When no new vehicle speed has been read, the CPU 30 determines at step ST304 whether or not a wheel slip signal is now being output from the output section 36. If a wheel slip signal is now being output from the output section 36 as determined at step ST304, the CPU 30 goes to step ST315, but if not, the CPU 30 reverts to step ST302 to read a further new vehicle speed.

Once a new vehicle speed has been read, the thus-read vehicle speed is set as the current vehicle speed Vn, at step ST305. At next step ST306, the CPU 30 calculates a vehicle speed reduction amount ΔV in accordance with a mathematical expression "ΔV=V0−Vn" defined by one of the arithmetic programs in the arithmetic/comparison program set 38. Then, at step ST307, a determination is made by the CPU 30 as to whether or not a wheel slip signal is now being output from the output section 36. If answered in the affirmative at step ST307, the CPU 30 goes to step ST308, but if no wheel slip signal is now being output, the CPU 30 moves to step ST308.

More specifically, the following operations are carried out when no wheel slip signal is now being output from the output section 36 as determined at step ST307. At step ST208, the CPU 30 makes a determination, in accordance with one of the comparison programs, as to whether the last vehicle speed V0 is greater than a predetermined slip-determination-responsive activating speed V2 (V0>V2). If so (YES determination), the CPU 30 moves on to step ST309, but if the last vehicle speed V0 is not greater than the predetermined slip-determination-responsive activating speed V2, then the CPU 30 loops back to step ST302 to read a further new vehicle speed.

At step ST309, a wheel-slip-determining threshold value ΔVs is set in accordance with the last vehicle speed V0 using the V0–ΔVs map 37 shown in FIG. 9. At next step ST310, the CPU 30 makes a further determination, in accordance with another one of the comparison programs, as to whether the vehicle speed reduction amount ΔV is greater than the thus-set wheel-slip-determining threshold value ΔVs (ΔV>ΔVs). If so, the CPU 30 judges that there has occurred a wheel slip and then moves on to step ST311. If, on the other hand, the vehicle speed reduction amount ΔV is not greater than the wheel-slip-determining threshold value ΔVs, the CPU 30 judges that no wheel slip has occurred and then the CPU 30 loops back to step ST302 to read a further new vehicle speed.

Once the CPU 30 judges that there has occurred a wheel slip, the wheel-slip-signal output section 36 starts outputting a wheel slip signal at step ST311, and simultaneously the timer 35 starts counting the output time of the wheel slip signal. The value of the last vehicle speed V0 at that point is stored in the memory 34 as an immediately-before-slip vehicle velocity Vi at step ST312.

On the other hand, the following operations are carried out when a wheel slip signal is now being output from the output section 36 as determined at step ST307. Note that the determination at ST307 becomes affirmative only after steps ST311 and ST312 have been taken; that is, the affirmative determination is made at ST307 when the wheel is slipping and the timer 35 has already started counting the output time of the wheel slip signal.

At step ST313, the CPU 30 makes a further determination, in accordance with still another one of the comparison programs, as to whether the vehicle speed reduction amount ΔV is of a negative value (ΔV<0). If the vehicle speed reduction amount ΔV is of a negative value, the CPU 30 moves on to step ST314. But, if vehicle speed reduction amount ΔV is equal to or greater than the zero value as determined at step ST313, the CPU 30 goes to step ST315. At step ST314, the CPU30 makes a further determination, in accordance with yet another one of the comparison programs, as to whether the current vehicle speed Vn is higher than a predetermined slip-terminating vehicle speed Ve (Vn>Ve).

If the current vehicle speed Vn is higher than the predetermined slip-terminating vehicle speed Ve as determined at step ST314, the CPU 30 proceeds to step ST317, but if current vehicle speed Vn is equal to or lower than of the predetermined slip-terminating vehicle speed Ve, then the CPU 30 goes to step ST315. Note that because the vehicle speed detection is performed in the second embodiment on the basis of the pulses from the wheel speed sensor, it is, in theory, impossible to detect extremely low vehicle speeds. Thus, in the second embodiment, the slip-terminating vehicle speed Ve is set to a very low speed that can be ever detected automatically.

At step ST315, an estimated current vehicle speed Vr is calculated, in accordance with a mathematical expression of "Vr=Vi−Gr×T" defined by another one of the arithmetic programs in the arithmetic/comparison program set 38, using the immediately-before-slip vehicle velocity Vi and output time T of the wheel slip signal stored in the memory 34 and a predetermined vehicle speed reduction value Gr. At next step ST316, the CPU 30 makes a further determination, in accordance with still another one of the comparison programs, as to whether the estimated current vehicle speed Vr is higher than a predetermined lower limit value V3 of the estimated current vehicle speed (Vr>V3). If the estimated current vehicle speed Vr is higher than the predetermined lower limit value V3, the CPU 30 reverts to step ST302, but if the estimated current vehicle speed Vr is equal to or lower than the predetermined lower limit value V3, then the CPU 30 proceeds to step ST317.

At step ST317, the CPU 30 causes the wheel-slip-signal output section 36 to stop outputting the wheel slip signal. At the same time, the CPU 30 causes the timer 35 to stop counting the output time of the wheel slip signal, at step ST318. The output of the wheel slip signal can be initiated and terminated through the above-described operations.

Next, a description will be made about the initiation and termination of the output of the wheel slip signal in the second embodiment, with reference to FIG. 11 showing specific examples of the vehicle speed pulses, vehicle speed, vehicle speed reduction amount and wheel slip signal. More specifically, (a) of FIG. 11 shows vehicle speed pulses when a wheel slip is caused by sudden braking, (b) a variation over time of the vehicle speed detected by the vehicle speed detection section 14A in response to each vehicle speed pulse, (c) a variation over time of the wheel-slip-determining threshold value ΔVs calculated within the wheel slip detection section 15A, and (d) the wheel slip signal output from the wheel slip detection section 15A. The wheel-slip-determining threshold value Δvs is determined by the last vehicle speed V0 in accordance with the characteristics shown in FIG. 9, and it is denoted by dotted lines in (c) of FIG. 11.

In FIG. 11, "A" represents a time section where the vehicle is traveling at a substantially constant speed. Because of the substantially constant speed, there is produced almost no vehicle speed reduction amount ΔV and the reduction amount ΔV does not exceed the wheel-slip-determining threshold value ΔVs in this "A" time section. "B" represents a time section where the vehicle speed deceases rapidly due to the wheel slip caused by the sudden braking.

At time point T1, where the wheel slip has already occurred, the vehicle speed detected by the detection section 14A is updated at short time intervals because the vehicle speed is still high at this time. Here, whereas the vehicle speed reduction amount ΔV is not so great, the wheel-slip-determining threshold value ΔVs is set to a small value in accordance with the V0–ΔVs map 37. Thus, the vehicle speed reduction amount ΔV exceeds the wheel-slip-determining threshold value ΔVs, so that the wheel slip can be detected properly. Calculation of the estimated current vehicle speed Vr and detection of termination of the wheel slip in time section "C" are carried out in substantially the same manner as in the first embodiment having been set forth above in relation to FIG. 6 and will not be described here to avoid unnecessary duplication.

The second embodiment arranged in the above-described manner can detect a wheel slip with high accuracy even in the case where a vehicle speed is detected, in response to each input vehicle speed pulse, in accordance with the cycles or frequency of the input vehicle speed pulses. Thus, even with a vehicle speed sensor of low detecting resolution, the second embodiment can accurately detect occurrence and termination of any wheel slip in a similar manner to the first embodiment. Note that the second embodiment is particularly useful in applications where vehicle speeds are detected via a vehicle speed sensor, such as one employed in a conventional vehicle speed meter, that outputs several pulses per rotation of the vehicle wheel.

With the above-described arrangements, the present invention affords the following benefits.

Namely, even when the value of the current vehicle speed signal is smaller than the predetermined apparatus-activating vehicle speed value, the hood activation control section in the present invention can properly activate the hood-lifting actuator, on condition that the wheel slip signal has been received from the wheel slip detection section and the collision detection signal has been received from the collision detection section. More specifically, even when the value of the current vehicle speed signal, output by the vehicle speed detection section while a human operator of the vehicle is applying sudden braking, is smaller than the predetermined apparatus-activating vehicle speed value, the present invention can detect a wheel slip on the basis of a plurality of vehicle speed signal values stored in the memory, and the hood-lifting actuator can be activated on condition that a collision of the vehicle has been detected by the collision detection section.

Further, in the case where the vehicle speed is detected by the vehicle speed detection section every predetermined time, a determination is made, at intervals of the predetermined time, as to whether the wheel slip signal is being output by the wheel slip detection section. Thus, the vehicle hood control apparatus of the present invention can promptly detect a wheel slip when the vehicle has encountered a collision with a certain external object, to thereby promptly activate the hood-lifting actuator. Further, in the case where the vehicle speed is detected in each cycle of the vehicle speed pulses, a wheel slip determination is made, in response to reception of each of the pulses, on the basis of a wheel-slip-determining threshold value determined in accordance with the value of the last vehicle speed signal, it is possible to output the wheel slip signal in an accurate manner, so that the hood-lifting actuator can be activated properly.

Furthermore, when the vehicle has collided with an external object due to a wheel slip at such a low vehicle speed (with the last vehicle speed signal below the predetermined value) that requires no activation of the hood-lifting actuator, the wheel slip detection section does not start outputting the wheel slip signal, and thus the vehicle hood control apparatus can prevent unnecessary activation of the hood-lifting actuator.

Moreover, when the vehicle speed is increasing and the value of the current vehicle speed signal is greater than the predetermined wheel-slip-terminating vehicle speed value, it is determined that the wheel slip has been brought to an end. Thus, the present invention can detect the termination of the wheel slip with high accuracy. Further, the wheel slip detection section terminates the output of the wheel slip signal, on condition that an estimated current vehicle speed-value calculated by the vehicle speed estimation section on the basis of 1) a value of the vehicle speed signal immediately before the wheel slip signal is output by the wheel slip detection section, 2) predetermined vehicle speed reduction value and 3) output time of the wheel slip signal counted by the timer has decreased to a low value range where the activation of the hood-lifting actuator is unnecessary. Thus, the present invention can prevent the vehicle hood control apparatus from being unnecessarily kept active for a long time in response to the wheel slip signals.

The present disclosure relates to the subject matter of Japanese Patent Application No. 2001-286760, filed Sep. 20, 2001, the disclosure of which is expressly incorporated herein by reference in its entirety.

What is claimed is:

1. A vehicle hood control apparatus for use with a vehicle including a hood-lifting actuator, which comprises:

a vehicle speed detection section for detecting a vehicle speed on the basis of wheel rotation signals indicative of rotation of a wheel of the vehicle and thereby outputting a vehicle speed signal;

a collision detection section for detecting a collision, with an external object, of the vehicle and thereby outputting a collision detection signal;

a memory for storing values of a plurality of the vehicle speed signals sequentially output by said vehicle speed detection section;

a wheel slip detection section for detecting a slip of the wheel on the basis of the values of the vehicle speed signals stored in said memory and thereby outputting a wheel slip detection signal; and a hood activation control section including means for determining whether a value of a current vehicle speed signal received from said vehicle speed detection section is equal to or greater than a predetermined apparatus-activating vehicle speed value to place said hood activation control section in a first state for awaiting reception of the collision detection signal or whether the value of the current vehicle speed signal is smaller than the predetermined apparatus-activating vehicle speed value to place said hood activation control section in a second state for awaiting reception of the wheel slip signal, wherein said hood activation control section being in said first state activates said hood-lifting actuator, on condition that the collision detection signal has been received from said collision detection section, wherein said hood activation control section being in said second state activates said hood-lifting actuator, on condition that the wheel slip signal has been received from said wheel slip detection section and that the collision detection signal has been received from said collision detection section.

2. A vehicle hood control apparatus as claimed in claim 1 wherein said vehicle speed detection section receives the wheel rotation signals to output the vehicle speed signal every predetermined time, and wherein said wheel slip detection section outputs the wheel slip signal, on condition that a value, stored in said memory, of a last vehicle speed signal output by said vehicle speed detection section the predetermined time before the current vehicle speed signal is equal to or greater than a predetermined vehicle speed value and that a vehicle speed reduction amount calculated on the basis of a difference between the values of the last and current vehicle speed signals is greater than a predetermined wheel-slip-determining threshold value.

3. A vehicle hood control apparatus as claimed in claim 2 wherein said wheel slip detection section terminates output of the wheel slip signal, on condition that the value of the current vehicle speed signal is greater than the value of the last vehicle speed signal and that the value of the current vehicle speed signal is greater than a predetermined wheel-slip-terminating vehicle speed value.

4. A vehicle hood control apparatus as claimed in claim 2 wherein said wheel slip detection section includes:

a timer for counting an output time of the wheel slip signal; and a vehicle speed estimation section for calculating an estimated current vehicle speed value of the vehicle, on the basis of a value of the vehicle speed signal immediately before the wheel slip signal is output by said wheel slip detection section, a predetermined vehicle speed reduction value and the output time of the wheel slip signal counted by said time, and wherein said wheel slip detection section terminates the output of the wheel slip signal, on condition that the estimated current vehicle speed value calculated by said vehicle speed estimation section has become equal to or smaller than a predetermined lower limit of the estimated current vehicle speed value.

5. A vehicle hood control apparatus as claimed in claim 1 wherein said vehicle speed detection section receives pulses output by pulse generation sections provided on a rotating member of the wheel and, in response to reception of each of the pulses, outputs the vehicle speed signal calculated on the basis of a length of an elapsed time from the reception, from said pulse generation sections, of a preceding pulse, and wherein said wheel slip detection section outputs the wheel slip signal, on condition that a value, stored in said memory, of a last vehicle speed signal corresponding to the preceding pulse is equal to or greater than a predetermined vehicle speed value and that a vehicle speed reduction amount calculated on the basis of a difference between the values of the last and current vehicle speed signals is greater than a wheel-slip-determining threshold value.

6. A vehicle hood control apparatus as claimed in claim 1 wherein said vehicle speed detection section receives pulse output by a plurality of pulse generation sections provided at uniform intervals on a rotating member of the wheel and, in response to reception of each of the pulse, outputs the vehicle speed signal calculated on the basis of a length of an elapsed time from the reception, from said pulse generation sections, of a preceding pulse, and wherein said wheel slip detection section outputs wheel slip signal, on condition that a value, stored in said memory, of last vehicle speed signal corresponding to the preceding pulse is equal to or greater than a predetermined vehicle speed value and that a vehicle speed reduction amount calculated on the basis of a difference between the values of the last and current vehicle speed signals is greater than a wheel-slip-determining threshold value determined in accordance with the value of the last vehicle speed signal.

* * * * *